B. L. WORTHEN.
MECHANICAL GUN.
APPLICATION FILED DEC. 4, 1916.

1,331,450.

Patented Feb. 17, 1920.
9 SHEETS—SHEET 3.

INVENTOR.
BURT L. WORTHEN
BY
Carlos P. Griffin
ATTORNEY.

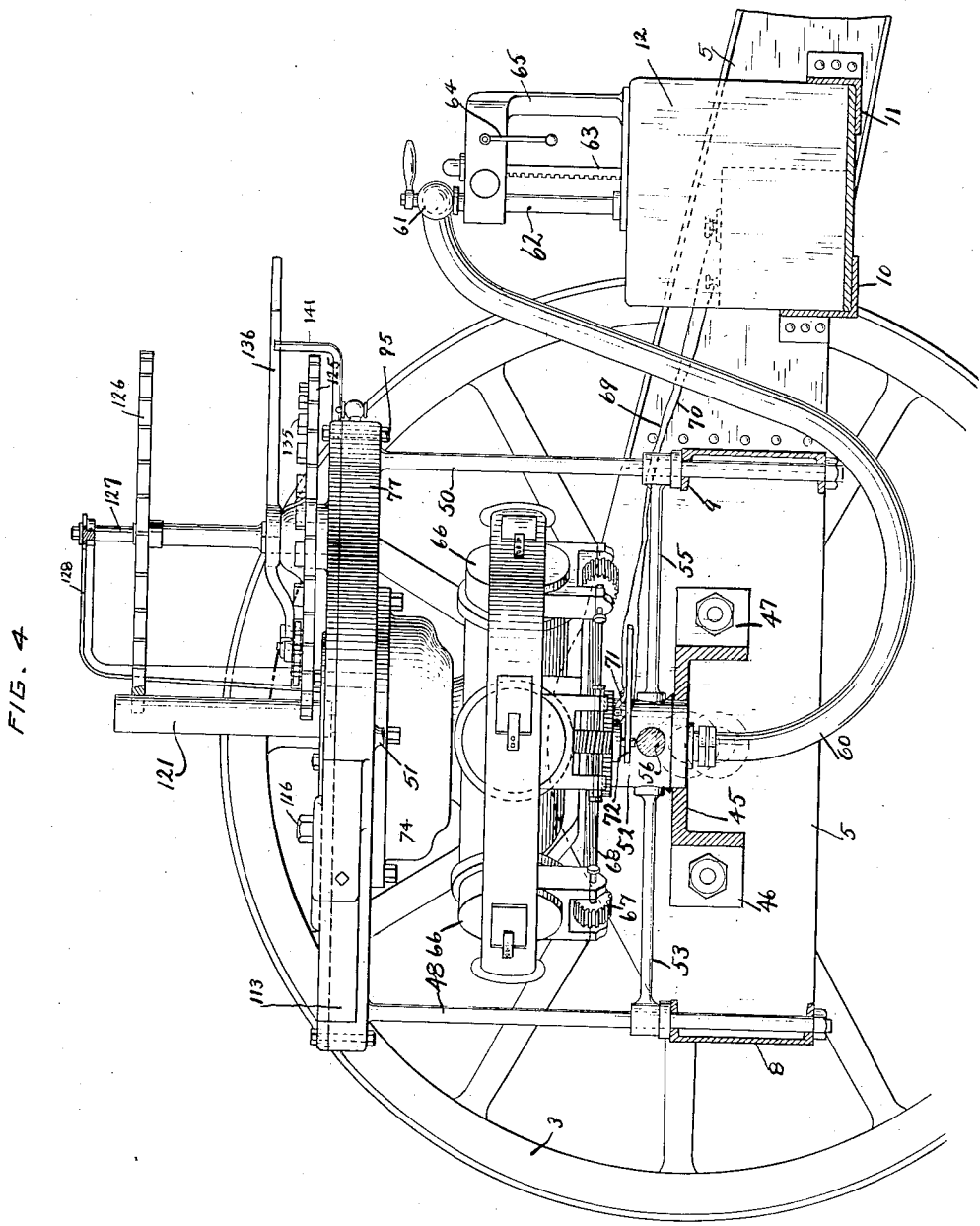

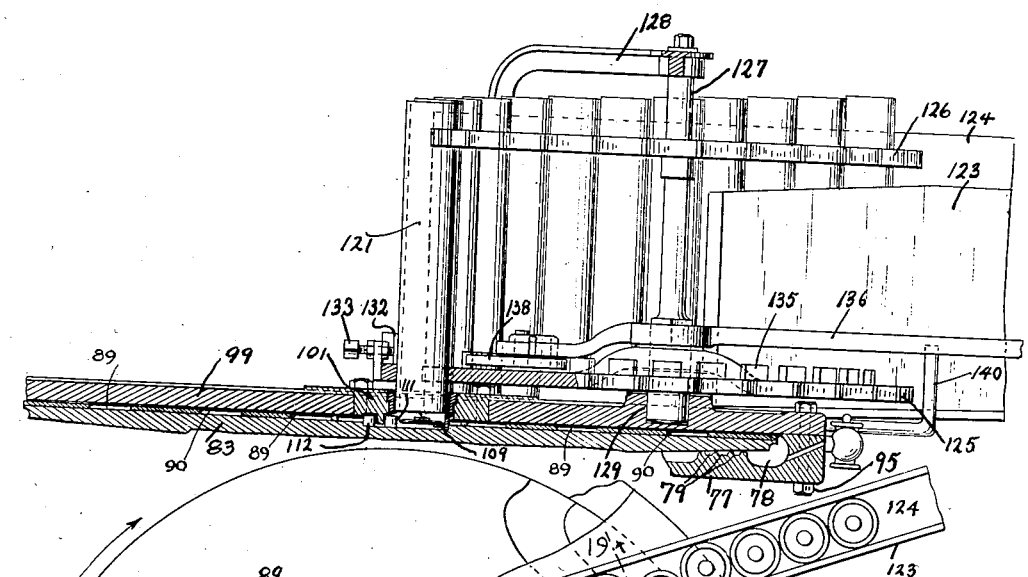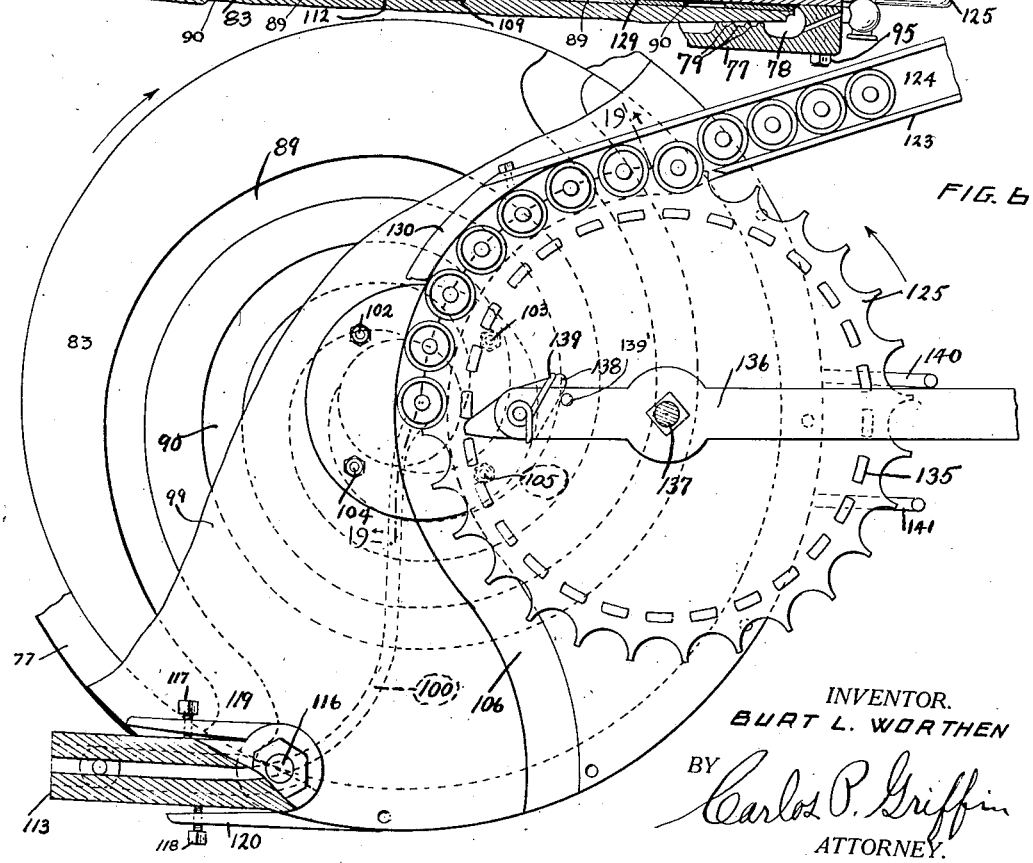

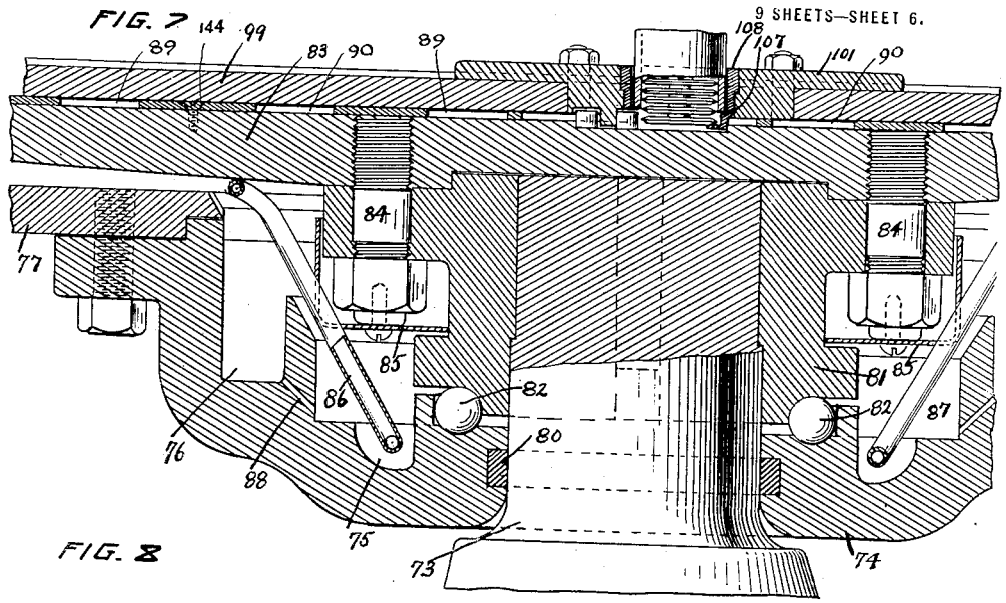
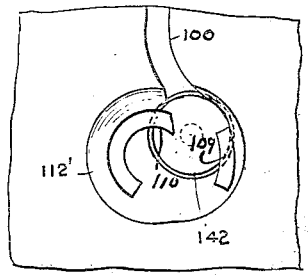
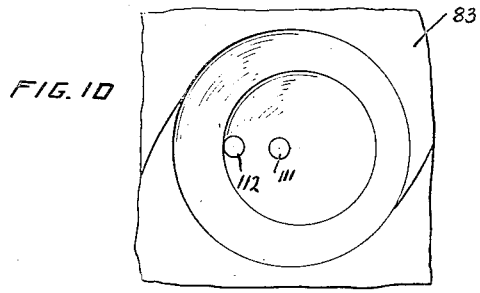
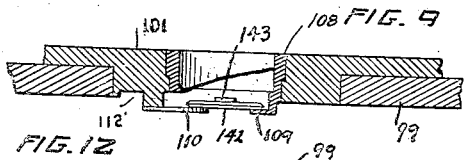
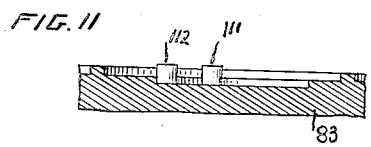
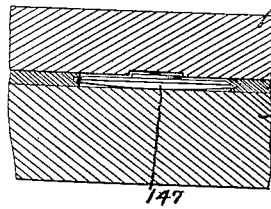
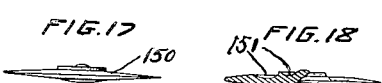
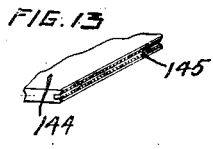
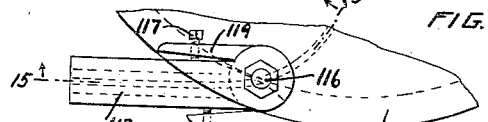
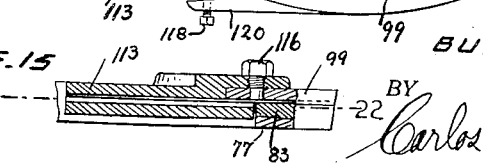
INVENTOR.
BURT L. WORTHEN

B. L. WORTHEN.
MECHANICAL GUN.
APPLICATION FILED DEC. 4, 1916.

1,331,450.

Patented Feb. 17, 1920.
9 SHEETS—SHEET 7.

INVENTOR
BURT L. WORTHEN
BY
Carlos P. Griffin
ATT'Y

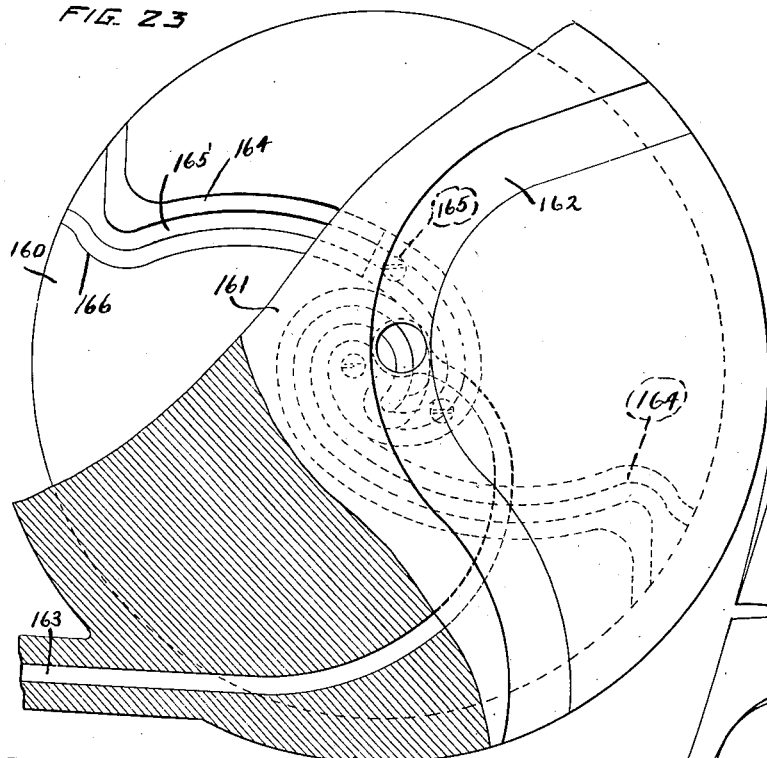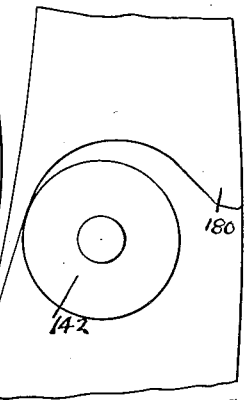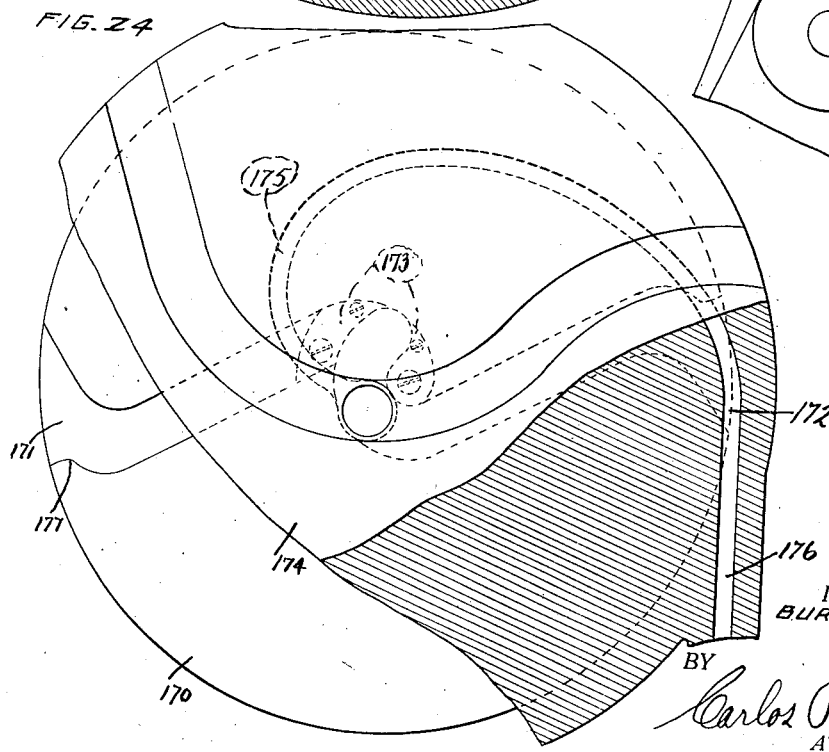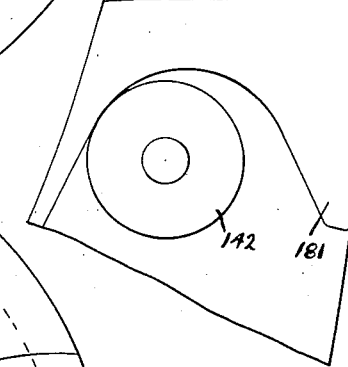

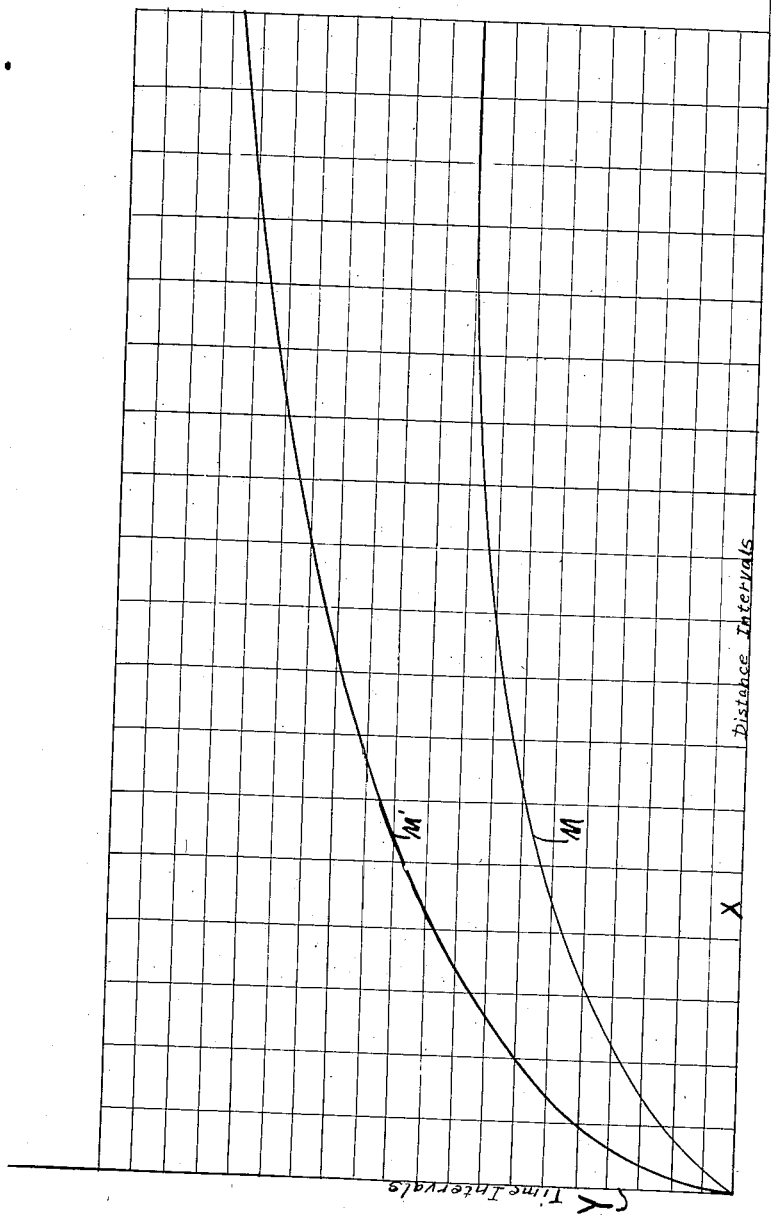

UNITED STATES PATENT OFFICE.

BURT L. WORTHEN, OF SAN FRANCISCO, CALIFORNIA, ASSIGNOR TO LEON P. LOWE, TRUSTEE, OF SAN FRANCISCO, CALIFORNIA.

MECHANICAL GUN.

1,331,450. Specification of Letters Patent. Patented Feb. 17, 1920.

Application filed December 4, 1916. Serial No. 134,845.

*To all whom it may concern:*

Be it known that I, BURT L. WORTHEN, a citizen of the United States, residing at San Francisco, in the county of San Francisco, State of California, have invented a new and useful Mechanical Gun, of which the following is a specification in such full and clear terms as will enable those skilled in the art to construct and use the same.

This invention relates to a gun for mechanically throwing a great number of flat disk light projectiles at a given target.

An object of the invention is to make use of the force developed by the action of a revoluble disk having a groove therein in conjunction with a fixed guideway whereby the projectiles will be delivered from the gun with great velocity and rotating around an axis at right angles to their line of travel whereby the projectiles will sail through the air to greater distances than will elongated projectiles revolving around their line of travel.

Another object of the invention is to produce a gun capable of automatically delivering an indefinitely large number of projectiles at a given target, a manual means being provided to operate the feeding mechanism carrying the projectile tube whereby the stream of projectiles may be continued at will or stopped at any moment after one projectile tube has been discharged.

Another object of the invention is to provide a feeding device for delivering the projectiles to the rotating disk and which will be of as simple construction as possible, and which will deliver the projectiles to the disk with the minimum velocity while they will be delivered therefrom with an exceedingly high velocity.

Other objects of the invention will appear as the description proceeds.

An embodiment of the invention is shown in the drawings in which the same reference numeral is applied to the same portion throughout, but I am aware that there may be many modifications thereof.

Fig. 4 is a side elevation on a slightly enlarged scale of the gun and its operating mechanism with one of the wheels of the carriage removed for the purpose of illustration.

Fig. 5 is a side elevation partly in section of a portion of the revoluble throwing disk and the feeding apparatus.

Fig. 6 is a plan view on the same scale as Fig. 5 of the throwing disk and feeding apparatus.

Fig. 7 is a vertical sectional view of the shaft supporting the throwing disk, the main bearing throwing disk and cover plate, only a portion near the end of said shaft being shown.

Fig. 8 is a bottom plan view of a portion of the feeding mechanism.

Fig. 9 is a vertical sectional view of the feeding mechanism.

Fig. 10 is a plan view of the throwing disk adjacent to the center thereof showing the position of the two pins which feed the projectiles off their supports, as shown in Fig. 9.

Fig. 11 is a sectional view and side elevation of the portion of the throwing disk adjacent to the center showing the feeding pins.

Fig. 12 is a view in section of the throwing disk, cover plate and guideway therein showing a form of projectile which bears principally at the center top and bottom and at one edge thereof, which causes it to rotate with a high velocity.

Fig. 13 shows a portion of one of the sides of the groove-way in the revoluble disk, said sides having suitable knurling to hold and rotate the disk.

Fig. 14 is a plan view illustrating the manner of varying the line of fire through small angles.

Fig. 15 is a vertical sectional view through the gun barrel on the line 15—15 of Fig. 14, and Figs. 16, 17 and 18 are side elevations, one of them partly in section of modified forms of projectiles which it can be found convenient to use.

Fig. 23 is a plan view partly in section of a disk and guide groove therefor having a different form of groove from that shown in the preceding figures.

Fig. 24 is a plan view partly in section of a rotating disk and cover therefor in which the grooved guideways of the two members are again different from that shown in Fig. 23 and illustrates the numerous forms the grooves of the revoluble disk and fixed disk may take.

Figs. 25 and 26 illustrate other different forms that the termination of these guideways may assume provided curves suited thereto are used for the fixed guideway, and Fig. 27 is a diagrammatic view illustrative of the different rates of acceleration that may be given to the projectile by different forms of movable guideways.

Figure 1:
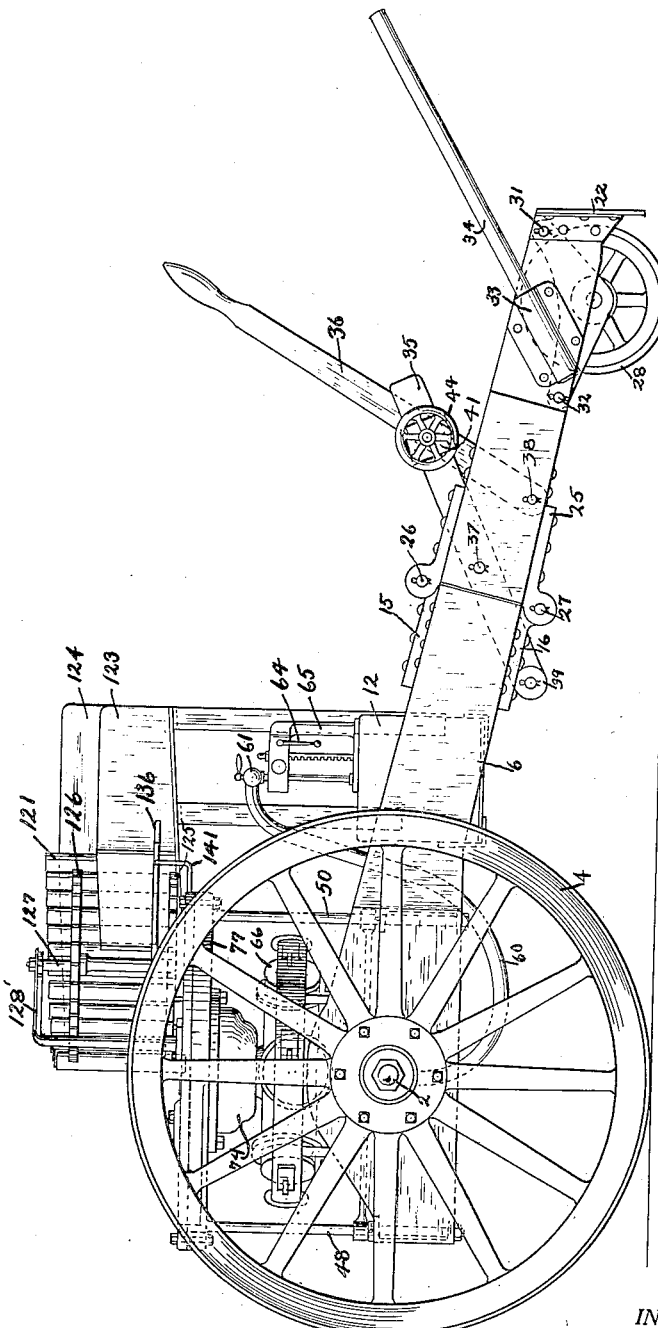
Figure 1 is a side elevation of the complete machine, as it appears ready for field use.

The gun is supported from trunnions 1 and 2 which form the axles for supporting wheels 3 and 4. The trunnions 1 and 2 are secured to side plates 5 and 6 respectively, which form the sides of a frame supporting the gun by means of two nuts 49', 51.' The side plates 5 and 6 are extended to the rear and converge rearwardly to form a pole for managing the gun. The side plates 5 and 6 are connected together by means of transverse channel bars 8, 9, and angle bars 10, 11. The channel bars 8 and 9 form the support for the operating parts of the gun, while the angle bars 10 and 11 form the supports for a fuel supply tank 12 and battery box 13. At the rear end of plates 5 and 6 there are hinge members 14, 15 above the plates and two similarly placed hinge members 16 below said plates. An extension of the pole is formed of two plates 18, 19, parallel respectively to the adjacent end plates 5 and 6 for a considerable distance, after which they extend parallel to each other as illustrated at 20, 21. The plates 19 and 20 are connected at their outer ends by means of a cross plate 22, which forms a support and abutment for the rear end of the gun when being operated, and at their other ends they are connected to the main frame of the gun by means of two hinge members 23, 24, on their upper side, and by means of two similarly placed hinge members 25 on their lower side, pairs of hinge members of the main frame and extension thereof being connected together by means of the pins 26, 27. When the carriage is being hauled from place to place its rear end is supported on a wheel 28, which wheel is journaled in two plates 29, 30, removably connected to the pole extension by means of the pins 31, 32. The object of the construction last described is to provide means whereby the wheel 28 may be raised out of contact with the ground, thereby permitting the plate 22 to contact therewith to hold the gun in a fixed position when being operated. A cleat 33 is secured on the side of the plate 19, and a handle 34, engaging said cleat, is used for moving the pole from one side to the other as may be required.

The object of the hinge previously described is to enable the gun barrel to be elevated or depressed as may be necessary, and this object is further attained by means of the two levers 35, 36. The two levers are pivoted to the pole extension by means of two pins 37, 38, and the lever 35 has a roller 39 which bears on the under side of a plate 40 secured to a channel iron 40', which is itself secured to the side plates 5, 6. A block 41 slides on the lever 35, said block being pivotally connected with the lever 36 by means of a bolt 43. When it is desired to raise the elevation of the gun, the pin 27 is removed and the levers 35, 36 are manipulated to allow the rear end of the pole to move down toward the ground, and when the desired elevation is reached they may be secured in that position by means of a hand wheel 44. If it is desired to lower the elevation of the gun, the pin 26 may be taken out, and in a similar manner the levers 35, 36 may be manipulated to raise the rear end of the pole, and thereby lower the gun, the pole being locked in any given position by means of the hand wheel 44 previously referred to.

Figure 2:
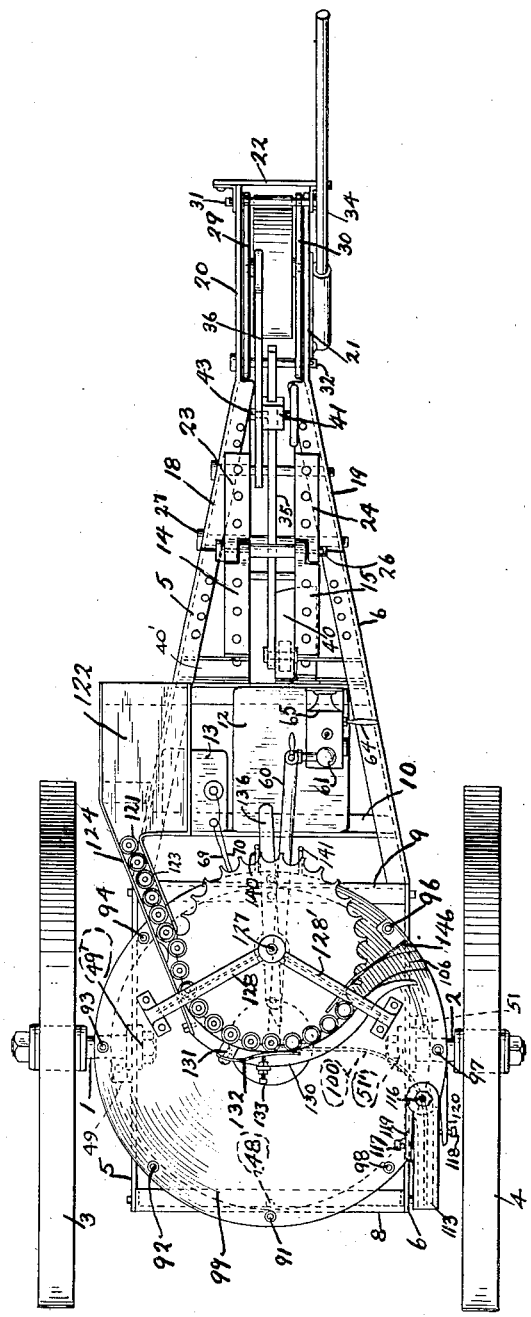
Fig. 2 is a plan view of the machine shown in Fig. 1.
Figure 3:
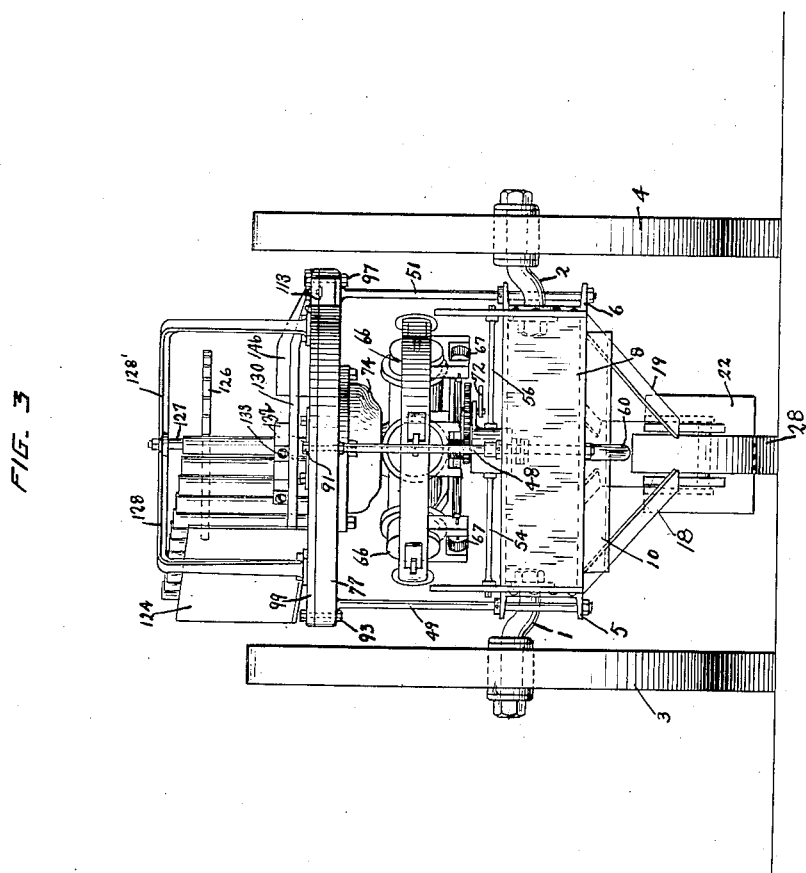
Fig. 3 is a front elevation of the complete machine.
Figure 19:
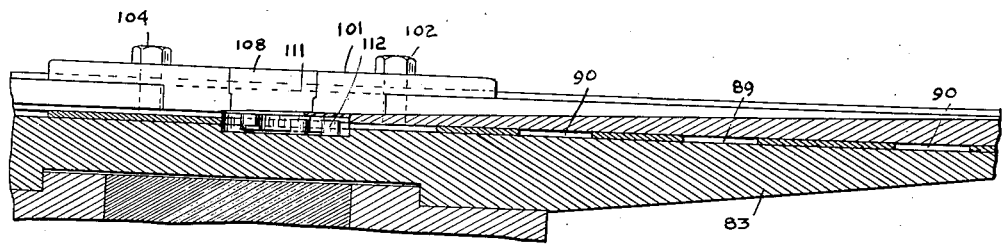
Fig. 19 is an enlarged vertical sectional view of the central portion of the throwing disk and cover therefor as shown in Fig. 5, the projectile magazines being omitted.
Figure 20:
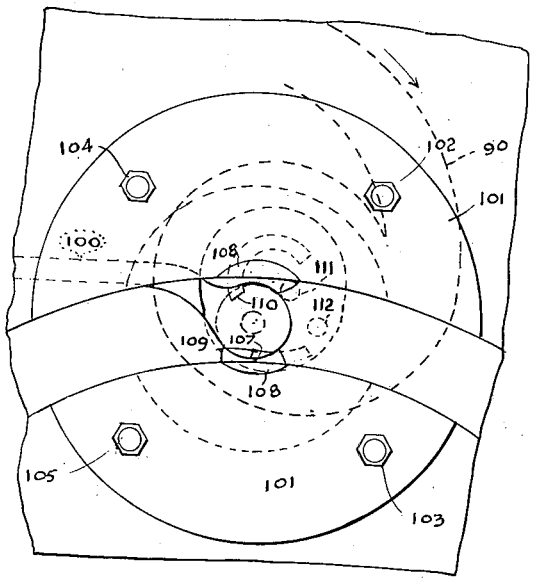
Fig. 20 is an enlarged plan view of a central portion of the apparatus, projectile magazines and the feeding mechanism therefor being omitted.
Figure 21:
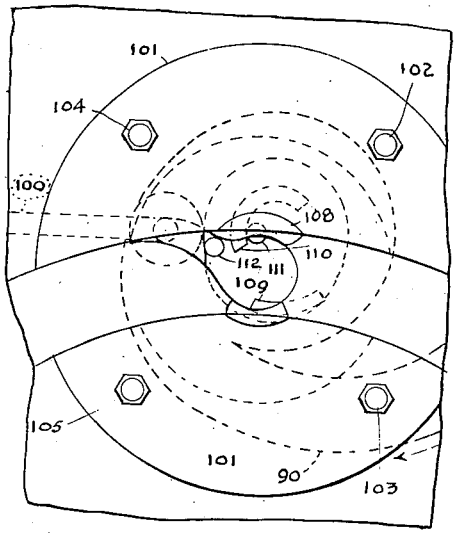
Fig. 21 is a similar view showing the parts in a position different from that in Fig. 20.
Figure 22:
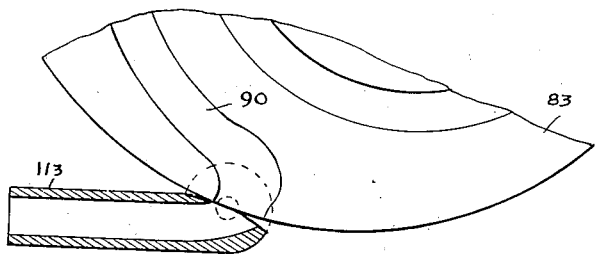
Fig. 22 is a broken sectional view on the line 22—22 of Fig. 15.

The gun proper is supported partly by means of a horizontally disposed channel plate 45 extending transversely between the side members 5 and 6 of the frame, and having at each end lugs 46, 47, bolted to said side members, and partly by means of four vertical supporting rods 48, 49, 50, 51, (see Fig. 4) of which the rods 48 and 50 extend through the flanges of the channel members 8 and 9, and the rods 49 and 51 extend through lugs extending outwardly from the side plates 5 and 6 (see Figs. 2 and 3). A lower support or bearing 52 (Fig. 4) for the crank shaft of an engine operating my improved gun is held in a fixed position by means of four rods 53, 54, 55, 56, supported at their outer ends by the rods 48, 49, 50, 51 respectively. The gasolene or other fluid fuel for the operation of the engine is supplied to a suitable apparatus in a part of this invention within said bearing 52 by means of a flexible tube 60, which is connected through a valve 61 with a pipe 62 extending into the gasolene tank 12, the gasolene or other fluid fuel being forced into said pipe by air pressure created by the operation of a piston rod 63 and a driving crank 64 supported on a post 65. The engine is of a well known type, having a plurality of cylinders 66 radially arranged around the crank shaft, which has its lower bearing in the support 52, and the valves of the engine are operated in a well known manner by means of gear wheels 67 and worm gears 68 with which the wheels 67 are in mesh. Wires 69, 70 extend from a battery box and coils to a make-and-break apparatus 71, 72, which determines the timing of the spark, all of which is not a part of the present invention.

Connected with the top of the engine is a shaft 73 (see Fig. 7) which extends through a central hole in a lower casing 74, and is connected in any suitable manner to a hub 81, which rests upon balls 82 forming the bearing therefor. Said hub 81 is secured to a rotating disk 83 by means of a plurality of bolts 84, which bolts also support a guard 85 which carries a pair of oil tubes 86, 87, the lower ends of which extend into a channel 75 in the casing 74, and, when rotating with the hub 81, pick the oil up from said channel 75 and throw it outwardly over a flat plate 77 secured by bolts to the casing 74 and which extends outwardly beyond the edge of the rotating disk 83. Said plate 77 has an oil retaining groove 78 at its outer edge and a plurality of oil grooves 79, upon the margins of which the outer edge of the disk 83 rides in contact therewith. An oil retaining felt ring 80 is inserted in a groove of the casing 74 around the shaft 73, the object being to prevent the oil in the casing from running down into the engine. The oil thrown out onto the plate 77 will work over said plate and into the grooves 79, thereby reducing the friction of the disk whenever it bears upon the plate 77, and any excess oil will run back into an outer channel 76 in the casing 74 and be delivered by small holes 88 into the channel 75, where it is again picked up.

The disk 83 has therein two projecting grooves or guideways 89, 90 which cause projectiles 142 to be thrown out from the gun in a manner to be presently explained. Secured on the plate 77 by means of bolts 91 to 98 inclusive, is a cover plate 99, said cover plate having therein a curved directing groove or guideway 100, which extends from the center of the rotating disk to the periphery thereof, and which forms the means whereby the projectiles are directed from the gun. In a central hole of the plate 99 is a plate 101 (see Figs. 6 and 7) and secured to the plate 83 by means of bolts 102 to 105, inclusive, and by means of which the projectiles are fed in position to be projected.

A feed groove 106 is formed in the plates 99 and 101 and tubular projectile magazines 121 travel down this groove 106, which has a closed bottom, until they arrive at a portion of the groove in which its sides are formed of hardened metal 108 set into said sides and the bottom of the groove has a circular hole therein sufficiently large to let a projectile 142 drop therethrough, a shoulder 107 surrounding said circular hole of sufficient width to sustain the edge of the magazine and prevent it dropping therethrough. The projectiles 142 drop in the tubular magazine 121, the lowermost projectile dropping through the hole until it rests upon two steps 109, 110, best shown in Figs. 7, 8 and 9, the former supported by the hardened portion 108 and the latter supported by the plate 101. The upper face of the disk 83 is provided with two pins 111, 112. The inner and outer edges of the step 110 are circular and concentric with the rotating disk 83, and the pin 111 is so located on said rotating disk that the center of the rotating disk is in the edge of the pin 111 farthest from the pin 112. Consequently, in the rotary movement of the rotating disk, the outer edge of the pin 111 travels along the inner edge of the step 110, and the pin 112 travels in a groove 112' formed in the under side of the plate 101. The hole through which the projectile drops is so located with reference to the pin 111 that, in the rotation of said pin with said rotating disk 83, said pin 111 contacts with said projectile and pushes it only a sufficient distance to enable the pin 112 which travels in the groove 112' to contact with the projectile, which it does, and push it farther into the groove 89 or 90, while at the same time a central hub-like projection 143 from the upper surface of the projectile 142 is pushed into the groove 100.

It is to be understood that there are provided two grooves 89 and 90 in the rotating disk 83, in order that there may be always one which is capable of being used, but only one of said grooves is in use at one time, since only one of them can be supplied by the pair of pins 111, 112.

At the outer end of the groove 100 the plate 99 is provided with a horizontal movable barrel 113, said barrel being pivotally mounted on a pivot pin 116 and being adjustable by means of two screws 117, 118, which pass through fixed members 119, 120, forming part of the plate 99. Said adjustment is for the purpose of slightly varying the line of fire, the projectiles being delivered from the groove 100 to the fixed barrel 113.

The projectile magazines 121 are carried in a box 122 (see Fig. 2) supported on the frame of the machine, from which box a chute 124 having sides 123 extends to the feeding mechanism, which consists of a pair of notched wheels 125, 126, mounted on a vertical shaft 127, which shaft has two arms 128, 128', to support it at its upper end, and a bearing 129 in the plate 99, for the support of its lower end. Secured on the plate 99 is a curved bar 130, (see Figs. 2 and 6), which holds the projectile magazines in position against the feeding wheels 125, 126. Said bar is provided with a block 131 and with a spring 132 attached to said block for the purpose of resiliently holding the feed wheels in the proper position to deliver a charge of projectiles to the firing disk. The pressure of this spring upon the tube is regulated by means of a set screw 133.

The lower feed wheel 125 has a circular series of upstanding lugs 135, which form the means whereby the wheel is shifted to bring one magazine after another into firing position and the shift is effected by means of a lever 136. Said lever 136 is loosely mounted upon the shaft 127 and pivoted upon an end thereof, adjacent to the spring 132, is a pawl 138, which is held by a spring 139 in a position so that its nose extends between two adjacent lugs 135. When the lever 136 is moved in the direction opposite to the arrow in Fig. 6, the nose of the pawl being held back by one of the lugs 135 with which it is in contact, said pawl is rotated upon the end of said lever until said nose can slip past said lug and take up its position between the next pair of lugs. Upon the return movement of the lever, the pawl is prevented returning by a pin 139', shown in dotted lines in Fig. 6, and the wheel 125 is rotated in the direction of the arrow, bringing the next projectile magazine into position to feed the projectiles therefrom.

In order to direct the projectile magazines away from the feeding mechanism after the projectiles have been discharged therefrom, a plate 146 is secured upon the plate 99 above the lower feed wheel 125.

The projectile 142 consists of a circular disk having its edge beveled or sharpened and carrying upon its upper side a central circular hub or lug 143. The main body of the projectile is fed into the projecting groove 89 or 90 of the rotating disk, while the hub 143 on its upper side is contained in the directing groove 100 and is directed thereby. The grooves 89 and 90 are formed, as shown in Figs. 7, 12 and 13, by securing to the top of said rotating disk by means of screws 144', thin hard plates 144, the edges of said plates 144 forming the walls of the groove, so that said plates may be renewed at will. The plate 144, at the edge with which the projectiles come in contact, is knurled and deeply grooved as indicated at 145 (see Fig. 13) to cause the disks to be rapidly rotated as it leaves the gun, thereby improving its stability in flight.

The projectiles used may take any one of several forms. They may be rounded on the under side, as indicated at 147 in Fig. 12. They may be provided with lugs 148, 149 on both sides, as indicated in Fig. 15. They may be very sharp on the edge, as indicated in Fig. 17. Or they may have hollowed portions as indicated at 151 on the projectile 152 in Fig. 18. In all cases the grooves 145 in the edges of the plate 144 must be formed to correspond with the shape of the edges of the projectiles.

The operation of the gun is as follows:—

Assuming the engine to be in rotation, and that the disk 83 is rotating therewith, the operator will place in the chute 124 leading to the feed wheels 125, 126, a magazine filled with projectiles and will move the feed wheels forward step by step, until the loaded projectile magazine comes over the center of the disk, whereupon the projectiles in the magazine drop to the steps 109, 110 and the pins 111, 112 will come in contact in succession with the bottom projectile, will push the projectiles one at a time off their supporting steps, one with each revolution of the disk 83, and will cause said projectiles to enter one of the projecting grooves 89 or 90 while the hub of the projectile is at the same time passed into the directing groove 100.

It will be evident that the particular shape of the grooves 89, 90 of the moving disk will depend upon the form given to the groove 100 of the fixed cover plate and the acceleration desired to be given to the projectile, and hence the grooves 89, 90 in the rotating disk may be curved in a variety of ways which will be effective in throwing the projectiles therefrom. After having assumed a given curve for the groove 100 in the fixed cover plate, the shape of the curve of the groove 89 or 90 in the movable disk may be readily determined for a given acceleration by laying off on the cover plate spaces corresponding to the given acceleration and then copying the same upon a disk movable thereunder and having a series of equal sectorial divisions. A pair of curves which have been found in practice to be effective, although not constructed to produce predetermined accelerations, is shown in Figs. 23 and 24, in which 160 indicates the movable disk, 161 the fixed cover plate having therein the projectile magazine feeding groove 162 and directing groove 163. The rotating disk has a wide projecting groove 164 and a narrow groove 165' extending centrally of the wide groove 164 to adapt it to throw projectiles with two lugs such as are shown in Fig. 16, and said latter grooves at their outer ends expand and curve sharply forward, especially the forward sides thereof, as shown at 166, whereby a very rapid acceleration is given to the projectile just as it leaves the rotating disk.

This rotating disk, like that shown in Fig. 6, is provided with two of the projecting grooves 164, although only one is used at a time. A plate 165 is used to block off one of the grooves, and said plate may be turned around to fill the other groove when desired. In Fig. 24 the rotating disk is shown at 170, and it is provided with two grooves 171, 172, only one of which is used at a time, as is determined by the position of the plates 173. In this construction the cover plate 174 is provided with a long spiral groove 175 which terminates in a straight barrel 176. In order to eject a projectile with sufficient force from a groove having a curve of this type, a more nearly straight groove in the rotating disk is necessary, and in order to give a rapid acceleration to the projectile, just as it is leaving the rotating disk, this straight groove is provided with a forwardly projecting portion 177.

In Figs. 25 and 26 are shown still other different forms of terminations for the grooves of the rotating disk. In these figures the projectile is indicated at 142 and the outer terminal portions of the groove at 180 and 181 respectively, said portions forming means whereby an extremely rapid acceleration is given to the projectile as it travels outward in grooves having such curves as are shown in the cover plates in Figs. 23 and 24.

In Fig. 27 is shown a diagram illustrative of the action of the movable groove in driving the projectile out of the fixed groove. In this figure the base line X indicates the path of travel of the projectile and distance. The line Y indicates time intervals divided into small quantities. The lines M′, M indicate different paths of the movable groove, and if those lines are moved down it will be seen that the time intervals become less for greater and greater distances traveled by the projectile thereby giving it an extremely rapid velocity when it leaves the gun.

It will be further understood that when the shape of the fixed groove is determined that the shape of the groove on the revoluble disk may then be at once found and is fixed for any particular rate of acceleration along the fixed groove and may be easily plotted as previously explained.

Having thus described my invention what I claim as new and desire to secure by Letters Patent of the United States, is as follows:—

1. A mechanically operated gun comprising revoluble member having a groove therein, a fixed member adjacent the revoluble member and having a peripherally extending guideway of a different width from the groove in the revoluble member, means to feed projectiles to the guideway adjacent the center of the revoluble member, and means to rotate said revoluble member to drive the projectiles therefrom.

2. A mechanically operated gun comprising the combination of a revoluble disk having a groove to engage a projectile, a fixed member adjacent the revoluble member having a groove narrower than the groove in the revoluble member to engage the projectile and means to rotate said revoluble member to drive the projectile away from the gun.

3. A mechanically operated gun comprising the combination of a revoluble disk having a groove therein adapted to engage a projectile, a fixed member adjacent the disk having a narrower groove to engage a projectile, and means to rotate the disk to drive the projectile away from the gun.

4. A mechanically operated gun comprising the combination of a revoluble disk having a spiral groove therein extending outwardly from the center of the disk to its periphery, a fixed member adjacent the revoluble member having a narrower groove therein to engage the projectile, and means to rotate the revoluble member to drive the projectile away from the gun.

5. A mechanically operated gun comprising the combination of a revoluble disk having a groove extending from the center to the periphery thereof, a fixed member adjacent the disk having a narrower groove to engage a projectile, means to feed projectiles to the disk adjacent the center thereof and means to rotate the disk to drive the projectiles fed thereto away from the gun.

6. A mechanically operated gun comprising a revoluble grooved disk, means to rotate the disk, a fixed member having a guideway narrower than the groove in the disk to determine the path of the projectile, means to feed projectiles to the grooved disk adjacent the center thereof, and a movable barrel forming an extension of the fixed guideway to vary the line of fire.

7. A mechanically operated gun comprising a revoluble grooved disk, a fixed member adjacent the disk having a curved peripherally extending guideway narrower than the groove in the disk, means to feed projectiles to the fixed and movable guideways adjacent the center of the disk and a revoluble carrier for placing fresh supplies of projectiles in the feeding position.

8. A mechanically operated gun comprising a revoluble grooved disk, a fixed member adjacent the disk and having a guideway extending from the center of the disk beyond its periphery for determining the path of the projectiles, means to rotate the disk, means to feed supplies of projectiles to the disk adjacent its center, and a manually operated lever for placing fresh supplies in the feed position.

9. A mechanically operated gun comprising the combination of a revoluble member having means to engage a projectile, a fixed member adjacent the revoluble member also having means to engage the projectile, means to rotate the revoluble member to drive a projectile away from the gun, and a revolving feeder for supplying tubes filled with projectiles to the gun.

10. A mechanically operated gun comprising the combination of a revoluble disk having a peripherally extending groove, a fixed plate adjacent the disk having a groove extending from the axis of the disk toward the periphery thereof, means to rotate the disk, a movable barrel for varying the path of travel of the projectile, and means to vary the plane of rotation of the disk whereby the trajectory of the projectile may be raised or lowered.

11. A mechanically operated gun comprising the combination of a frame, a revoluble disk mounted therein, and having a groove extending from its center toward its periphery, a fixed member adjacent the revoluble disk having a fixed groove narrower than the groove in the revoluble member extending from the center of the disk toward its periphery, means to rotate the disk and a revoluble feeder for delivering projectiles to the center of the revoluble disk to be projected from the gun.

12. A mechanically operated gun comprising the combination of a frame, a revoluble disk mounted therein, and having a groove extending from its center toward its periphery, a fixed member adjacent the revoluble disk having a fixed groove extending from the center of the disk toward the periphery thereof, means to rotate the disk, means to alter the plane of rotation of the disk whereby the trajectory of the projectile is raised or lowered, and a revoluble feeder for delivering series of projectiles to the gun at the center of the revoluble disk.

13. A mechanically operated gun comprising the combination of a frame, a revoluble grooved disk mounted therein, a plate adjacent the disk having a narrower groove extending from the center of the disk through the periphery thereof, the relation of the two grooves being such that a rapid acceleration will be given to the projectile, traveling along the fixed guide when the movable groove in the revoluble disk contacts therewith, means to rotate the revoluble disk and means to feed projectiles to the center thereof.

14. A mechanically operated gun comprising the combination of a revoluble disk having an open spiral groove extending from its center to its periphery, a cover over the disk having a narrower groove, a pivoted gun muzzle in the plane of the disk and means to adjust the muzzle in the plane of said disk to vary the line of travel of the projectiles.

15. A mechanically operated gun comprising the combination of a revoluble disk having an open groove extending from its center to the periphery thereof, a cover over the disk having a groove narrower than the groove in the disk, a directing gun muzzle in the plane of revolution of the disk and means to feed series of disk projectiles to the center of the revoluble disk.

16. A mechanically operated gun comprising the combination of a revoluble member having an open groove extending from its center to the periphery thereof, a fixed cover having a curved groove narrower than the groove in the revoluble member to determine the line of travel of a projectile placed in said groove, and means to vary said line of travel after the projectile has left the revoluble member.

17. A mechanically operated gun comprising a revoluble grooved disk, a peripherally extending guideway for determining the line of fire, means to feed projectiles to the center of the disk, and means to rotate the disk to drive the projectiles away therefrom along the guideway.

18. A mechanically operated gun comprising a revoluble grooved disk, means to rotate the disk, a peripherally extending guideway, means to feed projectiles to the grooved disk at the center thereof, and a movable barrel forming an extension of said guideway to vary the line of fire.

19. A mechanically operated gun comprising a revoluble grooved disk, a guideway adjacent said disk, a movable barrel forming an extension of said guideway, a revoluble feeder for feeding projectiles into the grooves of said disk, and means to rotate said disk to drive the projectiles out of the gun.

20. A mechanically operated gun comprising a revoluble grooved plate, a guideway adjacent the plate for directing the line of travel of the projectiles, a movable barrel at the end of said guideway, a revoluble feeder to direct the projectiles into the grooves of the revoluble grooved plate, a cylinder for holding a plurality of the projectiles over the center of the grooved plate, and means to rotate the grooved plate at a high rate of speed to drive the projectiles out of the gun.

21. A mechanically operated gun comprising a revoluble grooved disk, a fixed guideway for directing the line of travel of the projectiles, a revoluble feeder at the center of the grooved disk, a cylinder carrying a plurality of projectiles at the center of the grooved disk, and means to feed fresh loaded cylinders into position over the center of the disk when the projectiles have been exhausted.

22. A mechanically operated gun comprising a revoluble grooved plate, a support therefor on which the gun may be moved in a horizontal plane or in a vertical plane, a peripherally extending guideway for determining the line of travel of the projectiles, means to feed projectiles one at a time to the grooved plate, and means to rotate said grooved plate at a high rate of speed for driving the projectiles out of the gun.

23. A mechanically operated gun comprising a revoluble member having means thereon to engage a projectile, a fixed member over the revoluble member and having a peripherally extending guideway for determining the line of fire, means to feed projectiles to the guideway at the center of the revoluble member, and means to rotate said member to drive the projectiles away therefrom along the guideway.

In testimony whereof I have hereunto set my hand this 25th day of November A. D. 1916.

BURT L. WORTHEN.